UNITED STATES PATENT OFFICE.

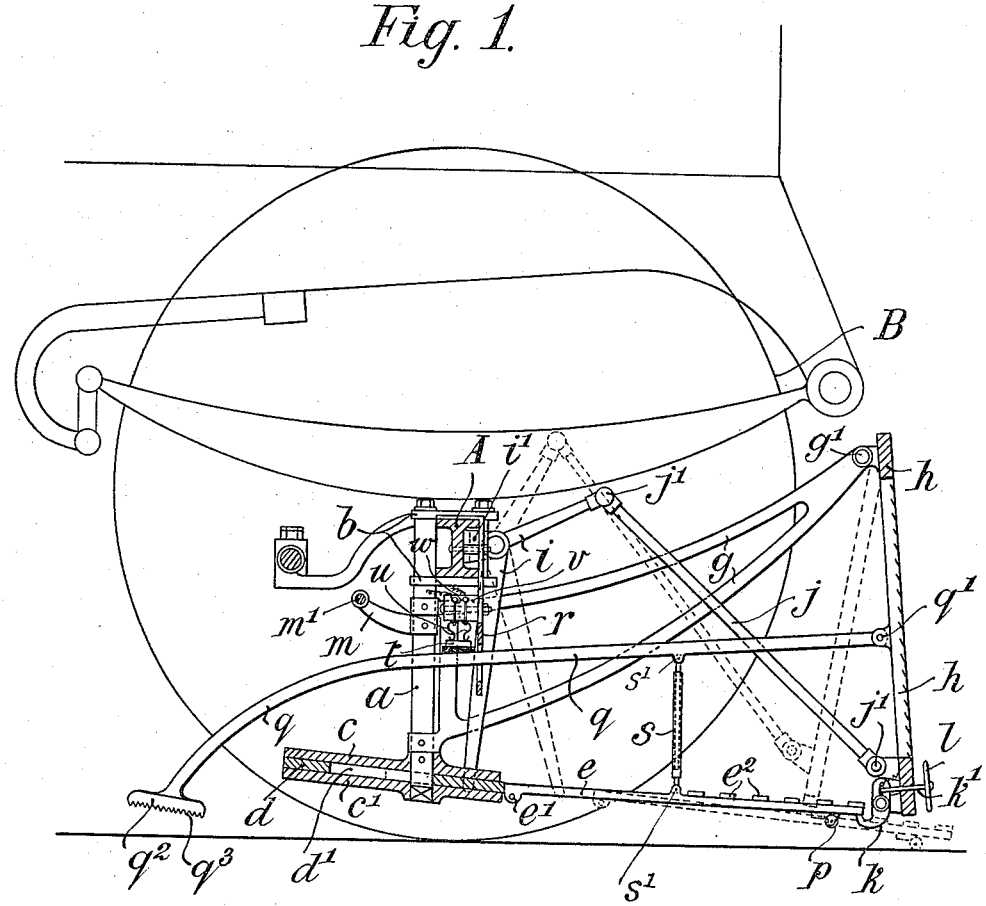

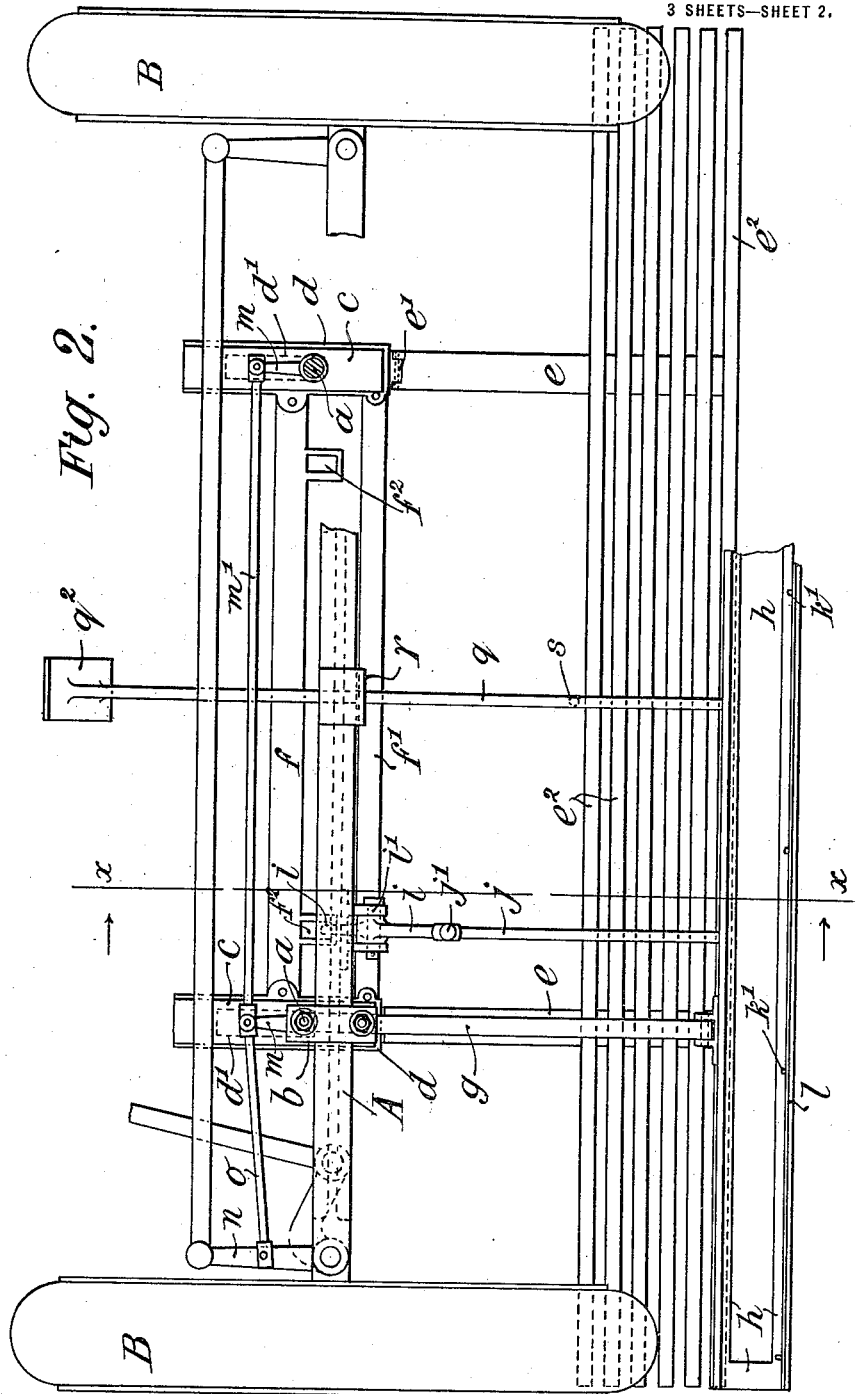

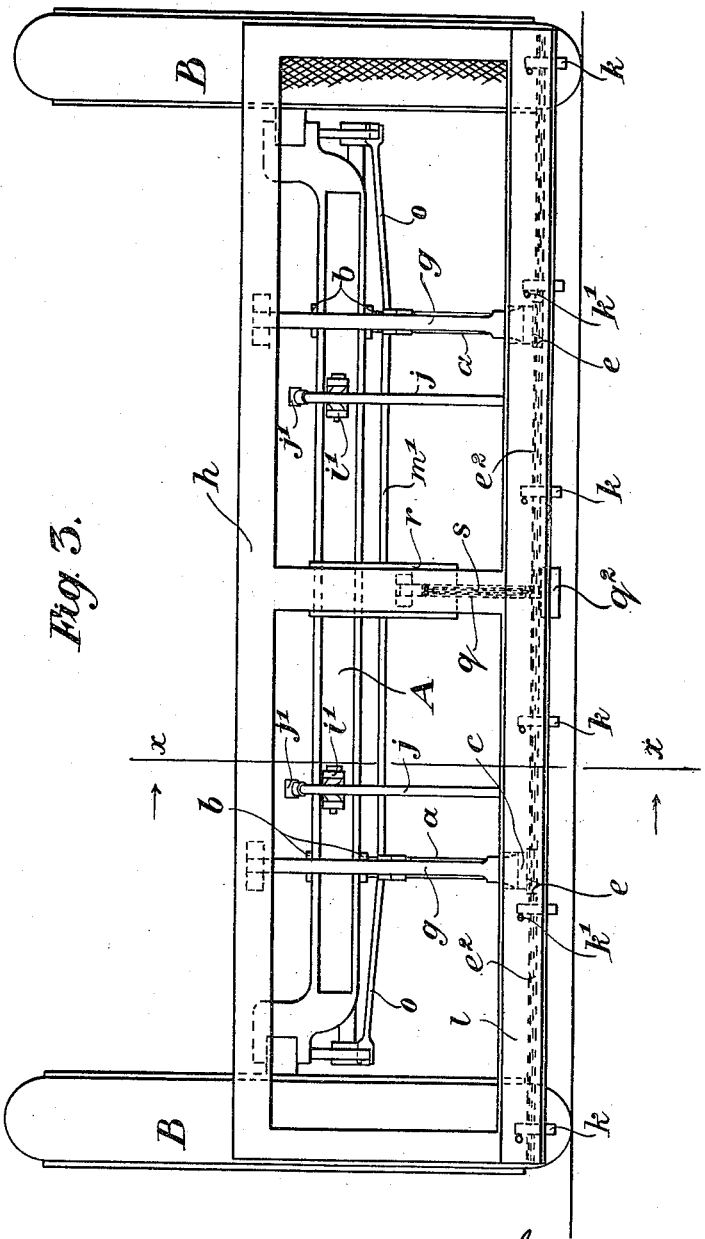

FREDERICK MAXWELL HAYES, OF WEST CROYDON, ENGLAND.

COMBINED WHEEL-FENDER AND BRAKE.

1,158,804.　　　　　Specification of Letters Patent.　　　Patented Nov. 2, 1915.

Application filed June 11, 1914.　Serial No. 844,484.

*To all whom it may concern:*

Be it known that I, FREDERICK MAXWELL HAYES, residing at West Croydon, in the county of Surrey, England, have invented certain new and useful Improvements in Combined Wheel-Fenders and Brakes; and I do hereby declare the following to be a full, clear, and exact description of the invention, such as will enable others skilled in the art to which it appertains to make and use the same.

This invention relates to apparatus for use with motor driven road vehicles for preventing or reducing the risk of accidents and has for its object to provide simple and efficient means for the purpose.

The said invention relates to that type of appliance wherein a frame or platform is slidably mounted in inclined position in guides or the like carried by and adapted to move with the steering movement of the steering wheels, said frame or platform being connected by suitable means whereby, upon an obstacle or person's body being met with, said platform is projected downwardly with the forward edge in close proximity to the road surface whereby the obstacles or person is caught thereby.

It relates also to that type embodying platforms capable of assuming a rhomboidal form when the vehicle is turning.

The present invention consists broadly of apparatus of the foregoing type wherein the platform is hingedly mounted on slidable members, the forward edge of said platform being held slightly above the ground with means whereby on impact between an obstacle and the said means the platform is released to be lowered and moved forward.

The invention also comprises means whereby upon release of the platform a rearwardly projected member is brought into contact with the road surface to assist the forward movement of said platform, said means also serving, in the case of vehicles driven by internal combustion engines to immediately cut off the current to the sparking plugs and thus stop the engine.

The accompanying drawings illustrate one form of apparatus made in accordance with the invention in which:—

Figure 1 is a cross-section through a wheel fender constructed according to this invention, and taken on the line $x$—$x$ in Figs. 2 and 3. Fig. 2 is a plan view of the wheel fender, with some parts omitted. Fig. 3 is a front view of the wheel fender.

In the drawings $a$ $a$ are two posts or pillars rotatably mounted in clamps $b$ carried on the vehicle axle A, to the lower end of which are secured two guides each consisting of upper and lower plates $c$ $c^1$ (see Fig. 1.) spaced apart and between which are slidably mounted members $d$ hingedly mounted at $e^1$ to the rear edge of the platform or catcher $e$. Said members $d$ are connected together by two parallel rods $f$ $f^1$ and they are also formed with a slot $d^1$ to permit of same sliding over the pillars $a$. Each of said pillars $a$ are provided with forwardly and upwardly projected brackets $g$ $g$ to the forward extremities $g^1$ of which is pivotally mounted a guard in the form of a frame $h$ covered with wire netting or otherwise and the lower end of which extends to within a short distance of the ground. This guard device $h$ extends transversely of the vehicle in front of the wheels B and similarly the transverse cross bars $e^2$ of the frame $e$ are made of a corresponding length.

$i$ are bell crank levers pivotally mounted in bearings $i^1$ on the axle A one arm of each of which is connected to the lower inner side of the guard $h$ by a link $j$ through suitable ball or other joints $j^1$. The other arms of the bell-crank levers $i$ project downwardly and engage pivotally with openings $f^2$ in the crossbar $f$.

In the normal position of the device shown in Fig. 1, the forward edge of the hinged platform $e$ is supported from contact with the ground by a number of hook-like spring pressed members $k$ pivotally mounted on the inner lower side of the guard $h$ and said members are coupled by rods $k^1$ extending through said guard and connected to a common plate or bar $l$.

$m$ $m$ are arms fixed upon the pillars $a$ connected together by a link $m^1$ one end of which is coupled to the steering arm $n$ by a link $o$.

Each of the cross bars $e^2$ are secured at two points only to the members $e$ whereby when the pillars $a$ are part rotated by the steering movement, the platform as a whole can take a rhomboidal form to follow the wheels and always be in front of both thereof during said steering movement.

In use, supposing a person falls in front of the vehicle, the plate *l* is caused to move backwardly onto the guard, whereby the members *k* are disengaged from the hinged platform, the lower edge of which falls to the ground, as shown in dotted lines (Fig. 1), rollers or small wheels *p* being provided to prevent same catching in the road surface. The continued movement of the vehicle against the obstruction causes the guard *h* to swing rearwardly, whereupon, by reason of the links *j* and bell cranks *i*, the whole of the platform is projected forwardly and thus the person is caught thereon and carried along without risk of the wheels passing over him, whether the vehicle is traveling in a straight or curved path.

For the purpose of assisting the rearward movement of the guard *h* and consequently the forward movement of the platform, a bar or rod *q* is provided pivoted upon the guard at $g^1$ and mounted in a slotted plate *r* depending from the axle A, said rod at its rear end being bent as shown and provided with a sprag plate $q^2$ having a toothed or serrated face $q^3$. The said rod is normally supported with the face $q^2$ free of the road surface by a pivoted and telescopic link *s*. This link *s* is arranged between the rod *q* and the catcher *e*, and has pivot pins $s^1$ for connecting its end portions to the said parts.

When the apparatus is brought into use, upon the platform *e* falling, the rod *q* also falls to bring the plate $q^3$ into frictional contact with the ground which, as the vehicle moves forward tends to act as a drag to pull the guard rearwardly and thus the shock between a person and said guard is minimized. The rod *q* may also serve, when released to effect the cut-off of the electric current to the sparking plugs of the motor, for which purpose said bar is provided with an insulated contact plate *t* adapted normally to close the circuit between two spring contacts *u* carried upon a block *v* on the depending arm *r*. The contacts *u* are connected to terminals *w* to which the leads are in turn connected, and it will be seen that as soon as the rod *q* falls the contact plate *t* is moved from the contacts and the circuit broken and thus the engine is automatically stopped.

What I claim and desire to secure by Letters Patent is:—

1. In a wheel fender, the combination, with a longitudinally slidable frame arranged to oscillate with the steering wheels and having its rear end portion pivotally supported, of means for normally supporting the front end portion of the said frame clear of the ground, and connections between the said means and slidable frame, whereby, when the said means strikes an obstacle, the front end of the frame is dropped and the frame is projected forwardly to pick up the obstacle.

2. In a wheel fender, the combination, with a longitudinally slidable frame for receiving the obstacle, said frame being arranged to oscillate with the steering road wheels and having its rear end portion supported pivotally, of a transverse frame having its upper end portion supported pivotally, retractible catches carried by the transverse frame and normally supporting the front end portion of the slidable frame clear of the ground, a slidable buffer-plate carried by and arranged in front of the transverse frame and operatively connected with the said catches, and connections between the two said frames whereby they are constrained to move in different directions.

3. In a wheel fender, the combination, with a longitudinally slidable frame for receiving the obstacle, said frame being arranged to oscillate with the steering road wheels and having its rear end portion supported pivotally, of a transverse frame having its upper end portion supported pivotally, catch mechanism normally supporting the front end portion of the slidable frame from the transverse frame and releasing it upon impact with an obstacle, connections between the two said frames whereby they are constrained to move in different directions, and a ground friction brake operatively connected with the transverse frame and normally supported clear of the ground by the slidable frame.

4. In a wheel fender, the combination with a steering axle, of revoluble pillars supported by the said axle and operatively connected with the steering mechanism so that they oscillate with the steering ground wheels, guides secured to the said pillars, a pivoted frame having its rear end portion longitudinally slidable in the said guides, means for normally supporting the front end portion of the said frame clear of the ground, and connections between the said means and slidable frame, whereby, when the said means strike an obstacle, the front end of the frame is dropped and the frame is projected forwardly to pick up the obstacle.

5. In a wheel fender, the combination, with a steering axle, of revoluble pillars supported by the said axle and operatively connected with the steering mechanism so that they oscillate with the steering ground wheels, guides secured to the said pillars, a pivoted frame having its rear end portion longitudinally slidable in the said guides, arms secured to the said pillars and projecting forwardly, a transverse frame having its upper part pivoted to the said arms, retractible catch mechanism normally supporting the front end portion of the slidable frame from the transverse frame, and lever mechanism connecting the two said frames and constraining them to move in different directions.

In testimony whereof I affix my signature, in presence of two witnesses.

FRED. MAXWELL HAYES.

Witnesses:
A. W. WINSALL,
R. TURNER.

Copies of this patent may be obtained for five cents each, by addressing the "Commissioner of Patents, Washington, D. C."